United States Patent
Nagoya et al.

(10) Patent No.: US 7,140,496 B2
(45) Date of Patent: Nov. 28, 2006

(54) MULTILAYER MICROPOROUS MEMBRANE

(75) Inventors: Fujiharu Nagoya, Yokohama (JP); Ichiro Koguma, Yokohama (JP)

(73) Assignee: Asahi Kasei Medical Co., Ltd., Tokyo (JP)

( * ) Notice: Subject to any disclaimer, the term of this patent is extended or adjusted under 35 U.S.C. 154(b) by 59 days.

(21) Appl. No.: 10/343,691

(22) PCT Filed: Jul. 31, 2002

(86) PCT No.: PCT/JP02/07818

§ 371 (c)(1),
(2), (4) Date: Jan. 31, 2003

(87) PCT Pub. No.: WO03/026779

PCT Pub. Date: Apr. 3, 2003

(65) Prior Publication Data

US 2004/0023017 A1 Feb. 5, 2004

(30) Foreign Application Priority Data

Aug. 1, 2001 (JP) ............................. 2001-234035

(51) Int. Cl.
*B01D 29/01* (2006.01)
(52) U.S. Cl. ............ 210/490; 210/500.27; 210/500.42; 428/310.5; 428/311.51; 428/315.5; 428/315.7
(58) Field of Classification Search ............ 428/310.5, 428/311.51, 315.5, 315.7; 210/500.62, 490, 210/500.27
See application file for complete search history.

(56) References Cited

U.S. PATENT DOCUMENTS

| | | | |
|---|---|---|---|
| 4,247,498 A | 1/1981 | Castro | |
| 4,399,035 A | 8/1983 | Nohmi et al. | |
| 4,539,256 A | 9/1985 | Shipman | |
| 4,808,315 A | 2/1989 | Manabe et al. | |
| 4,845,132 A | 7/1989 | Masuoka et al. | |
| 4,937,115 A | 6/1990 | Leatherman | |
| 5,017,292 A | 5/1991 | DiLeo et al. | |
| 5,514,461 A | 5/1996 | Meguro et al. | |
| 6,019,925 A * | 2/2000 | Diamantoglou et al. | .... 264/203 |
| 6,096,213 A | 8/2000 | Radovanovic et al. | |
| 6,299,773 B1 | 10/2001 | Takamura et al. | |
| 2003/0209485 A1* | 11/2003 | Kools | |
| 2004/0023017 A1 | 2/2004 | Nagoya et al. | |

FOREIGN PATENT DOCUMENTS

| | | |
|---|---|---|
| EP | 0 297 744 A2 | 1/1989 |
| EP | 0 302 949 A1 | 2/1989 |
| EP | 0 365 112 A2 | 4/1990 |
| EP | 1 063 256 A1 | 12/2000 |
| EP | 1 206 961 A1 | 5/2002 |
| EP | 1 230 970 A1 | 8/2002 |
| JP | 58-91732 A | 5/1983 |
| JP | 59-16503 A | 1/1984 |
| JP | 59-64640 A | 4/1984 |
| JP | 60-97001 A | 5/1985 |
| JP | 62-179540 | 8/1987 |
| JP | 3-502180 A | 5/1991 |
| JP | 3-228671 | 10/1991 |
| JP | 5-506883 A | 10/1993 |
| JP | 7-505830 | 6/1995 |
| JP | 7173323 | 7/1995 |
| JP | 7265674 | 4/1998 |
| JP | A-8-168658 | 4/1998 |
| JP | 2000-15066 A | 1/2000 |
| JP | 2001157827 | 6/2001 |
| JP | 2001190940 | 7/2001 |
| WO | WO91/16968 | 11/1991 |
| WO | WO-93/04223 A1 | 3/1993 |
| WO | WO-93/22039 | 11/1993 |
| WO | WO 9523640 A1 * | 9/1995 |
| WO | WO-98/39379 A1 | 9/1998 |
| WO | WO99/47593 | 9/1999 |
| WO | WO 01/05492 A1 | 1/2001 |
| WO | WO 01/14047 A1 | 3/2001 |
| WO | WO 01/28667 A1 | 4/2001 |
| WO | WO 02/102500 | 12/2002 |

OTHER PUBLICATIONS

Translation of JP 08-168658, Masaru et al, "Film with Microporous Layer, Composite Film and Liquid Separating Process," Jul. 2, 1996.*
Supplementary European Search Report dated Aug. 30, 2004.
Translation of the International Search Report compiled for the parent PCT application PCT/JP2003/13329.

* cited by examiner

*Primary Examiner*—Hai Vo
(74) *Attorney, Agent, or Firm*—Dickstein Shapiro LLP (57) ABSTRACT

A multilayer microporous membrane containing a thermoplastic resin, comprising a coarse structure layer with a higher open pore ratio and a fine structure layer with a lower open pore ratio, wherein said coarse structure layer is present at least in one membrane surface having a thickness of not less than 5.0 μm, a thickness of said fine structure layer is not less than 50% of the whole membrane thickness, and said coarse structure layer and said fine structure layer are formed in one-piece.

16 Claims, 3 Drawing Sheets

MULTILAYER MICROPOROUS MEMBRANE

TECHNICAL FIELD

The present invention relates to a microporous membrane having a superior permeability. More particularly, the present invention relates to a microporous membrane suitable for removal of minute substances such as viruses, from a solution containing physiologically active substances such as proteins.

BACKGROUND ART

Recently, problems with pathogens such as viruses and pathogenic proteins, which may possibly exist as contaminants in a solution for injection, have been highlighted as a critical situation. This is especially true when a liquid preparation containing a physiologically active substance such as plasma derivatives, biopharmaceuticals or plasma for transfusion is administered into a human body. A method for removing or inactivating such pathogens is required.

Methods for inactivating viruses include heating processes and treatments using chemical agents (for example solvent/detergent (S/D) treatment). However, these methods are limited in their inactivation effects depending on types of viruses. For example, a heating process is less effective for thermostable viruses such as hepatitis A virus. Further, an S/D treatment has virtually no effect on viruses such as parvovirus which have no lipid membrane. In a treatment using chemical agents, since there is a possibility that the chemical agent used may be administered into a human body, a process for removing the chemical agent may be required.

Membrane filtration is known as a method for physically removing viruses. Since a procedure for separation is performed using a membrane filtration system which is dependent on a size of virus particles, it is effective for all viruses regardless of chemical or thermal natures of viruses.

A type of virus ranges from the smallest viruses such as parvovirus having a diameter of about 18–24 nm or poliovirus having a diameter of about 25–30 nm to a relatively large virus such as HIV having a diameter of 80–100 nm. In order to remove such groups of viruses by physical means using the membrane filtration, a microporous membrane having a maximum pore diameter of 100 nm or less is required. The need for a system for removing small viruses such as parvovirus has been increased recently.

Virus removal membrans, which can be used for purification of plasma derivatives and biopharmaceuticals by removing viruses, must have not only viral removal ability but also a high permeability for physiologically active substances such as albumin and globulin. For such purposes, ultrafiltration membranes having a pore diameter of several nm and reverse osmotic membranes having a smaller size of pore diameter are not suitable as a virus removal membrane.

Even if microporous membranes have a pore diameter suitable for the viral removal, the microporous membranes, such as an ultrafiltration membrane, having large voids inside the membrane and carrying appropriate filtration characteristics in a surface skin layer, have a low reliability for viral removal. The reason is that there are always significant deficiencies such as pinholes or cracks in the skin layer and large voids inside the membrane. The skin layer herein means an extremely thin layer existing on one side or both sides of the membrane, and having a dencer structure as compared with an inner region of the membrane.

A membrane constructed with a gradient structure with continuously increasing pore diameter from one side of the membrane surface to the other is not suitable for viral removal. In order to perform the viral removal completely, the membrane must have a structure in which a homogeneous structural region having no large internal void as well as having extremely few or almost no continuous change in a pore diameter along a thickness direction, is present with a certain thickness. In such a structure, a mechanism of filtration generally called "depth filtration" is generated. As a result, a highly reliable viral removal capability can be obtained as a sum of the viral removal in each minute region of a membrane thickness.

During a final process of manufacturing, a microporous membrane to be used for the viral removal is treated with some sterilization treatment in order to guarantee safety of the product. Sterilization procedures used include: a method using chemical agents, a method using ultraviolet irradiation or γ-ray irradiation, a method using steam sterilization and the like. Use of chemical agents may exert harmful effects on a human body caused by residual trace chemical agents remaining in a microporous membrane. A sterilization method using ultraviolet irradiation is not suitable for sterilization in the final process due to a low transmissivity of ultraviolet rays. A sterilization method using γ-ray irradiation is unreliable due to irradiation damage caused in a microporous membrane. It seems that use of steam is the most secure, reliable and preferable method. In this case, materials used in a microporous membrane are required to have a thermal stability, since the membrane should be treated by the steam sterilization at high temperature.

In order to prevent adsorption of protein, a component of a preparation, to a microporous membrane, the membrane should preferably be hydrophilic. Consequently, it is preferable to use membrane materials that are originally hydrophilic or to introduce hydrophilic nature into the membrane by a post-treatment. However, when hydrophilic materials are used, there is a possibility of remarkable deterioration in mechanical properties of the membrane due to swelling of the membrane with water. Consequently, it is preferable to prepare a hydrophilic microporous membrane firstly by constructing a physical structure of the membrane with hydrophobic materials, and thereafter hydrophilizing the surface of micropore of the constructed membrane.

In a case of industrial production of plasma derivatives and biopharmaceuticals, it is preferable to use a membrane having a high permeation rate for a solution containing physiologically active substances in order to increase productivity. However, a solution containing physiologically active substances such as globulin contains large amounts of suspended substances as polymers such as dimers or more. These suspended substances cause clogging of pores of a microporous membrane. As a result, filtration rate is rapidly decreased. The smaller the size of the micropore diameter, the more this tendency is significantly increased. As a result, filtration resistance is sometimes rapidly increased due to an accumulation of the suspended materials on a membrane surface. In order to reduce the inconvenience, a pre-filter with larger pore diameter is conventionally used to remove the suspended substances. However, it is difficult to remove the suspended substances completely by using a pre-filter. In addition, since use of two types of filters results in an increased cost, a membrane which does not result in clogging in the presence of the suspended substances, is eagerly demanded.

JP-A-7-265674 discloses a polyvinylidene fluoride membrane which can be used for the viral removal from a solution, and a term "isotropic" is used in the claims thereof. However, the "isotropic" membrane often had a problem of drastic decrease in treatment amount due to clogging or accumulation of the suspended substances onto a membrane surface, because a liquid for which the microporous membrane is used for the purpose of viral removal generally contains physiologically active substances and thus a variety of suspended substances.

WO 99/47593 discloses a polyvinylidene fluoride membrane which has a surface layer with improved open pore ratio by using a specified cooling medium, and describes that said surface layer can have a pre-filtering function. However, the thickness of said surface layer is not greater than 3 µm, resulting in the problem of not exhibiting a sufficient pre-filtering effect during filtration of a liquid containing a variety of suspended substances such as protein solutions.

JP-A-7-173323 discloses a polyvinylidene fluoride microporous membrane manufactured by making a difference between cooling rates at both membrane surfaces from each other in a cooling process. Under this condition, a pore diameter at the surface cooled at slower rates becomes larger, and thus providing a difference between pore diameters on each surface of the membrane. A pore diameter ratio of both membrane surfaces is specified as 4–10 in the claims of said publication. In the method according to said publication, cooling speed varies continuously along a membrane thickness direction, providing a continuous change in a membrane structure along a membrane thickness direction, and further a noticeable gradient structure having a pore diameter difference of over four times between both membrane surfaces. In such a manufacturing method, a fine structure layer which has a highly accurate homogeneity to realize a depth filtration required for the viral removal, cannot be obtained.

WO 91/16968 discloses, as a polyvinylidene fluoride membrane to be used for the viral removal from a solution, a microporous membrane comprising a supporting body, a surface skin and an intermediate porous region present between the supporting body and the skin, produced by coating and coagulating a polymer solution on the supporting body having pores and thus forming the skin layer and the intermediate porous layer onto said supporting body. However, said microporous membrane does not have a one-piece structure nor a fine structure layer of the present invention.

DISCLOSURE OF THE INVENTION

An object of the present invention is to provide a microporous membrane with a superior permeability. Further object of the present invention is to provide a microporous membrane to exhibit a performance sufficient to remove viruses and the like and have a superior permeability for physiologically active substances such as proteins.

After an enthusiastic study to solve the above described problems, the present inventors found that a microporous membrane to exhibit a performance sufficient to remove viruses and have a superior permeability for physiologically active substances such as proteins, could be obtained by forming a multilayer structure comprising a coarse structure layer with a large open pore ratio and a fine structure layer with a small open pore ratio, and finally accomplished the present invention.

Thus, the present invention provides:

[1] A multilayer microporous membrane containing a thermoplastic resin, comprising a coarse structure layer with a higher open pore ratio and a fine structure layer with a lower open pore ratio, wherein said coarse structure layer is present at least in one membrane surface having a thickness of not less than 5.0 µm, the thickness of said fine structure layer is not less than 50% of the whole membrane thickness, and said coarse structure layer and said fine structure layer are formed in one-piece.

[2] The multilayer microporous membrane in accordance with the above described [1], wherein said coarse structure layer is a layer having an open pore ratio not less than the average open pore ratio of the whole membrane thickness+2.0% and said fine structure layer is a layer having an open pore ratio less than the average open pore ratio of the whole membrane thickness+2.0% and in the range of "an average value of an open pore ratio of a layer having an open pore ratio less than the average open pore ratio of the whole membrane thickness+2.0%"±2.0% (inclusive of both limits).

[3] The multilayer microporous membrane in accordance with the above described [2], wherein said coarse structure layer has a gradient structure in which an open pore ratio thereof is continuously decreasing from a membrane surface toward said fine structure layer.

[4] The multilayer microporous membrane in accordance with any one of the above described [1]–[3], wherein an average pore diameter of a membrane surface of said coarse structure layer is not less than two times the maximum pore diameter determined by the bubble point method.

[5] The multilayer microporous membrane in accordance with any one of the above described [1]–[4], wherein said coarse structure layer is present only in one side of the membrane surface.

[6] The multilayer microporous membrane in accordance with any one of the above described [1]–[5], wherein said thermoplastic resin is a polyvinylidene fluoride resin.

[7] The multilayer microporous membrane in accordance with any one of the above described [1]–[6], wherein the maximum pore diameter determined by the bubble point method is 10–100 nm.

[8] A method for manufacturing a multilayer microporous membrane in accordance with the above described [5], comprising the following steps (a)–(c):

(a) a step of forming a membrane by heating a composition comprising a thermoplastic resin and a plasticizer at a temperature not lower than crystal melting point of said thermoplastic resin to homogeneously dissolve them and then extruding said composition from a discharge opening; (b) a step of forming a coarse structure layer and a fine structure layer by contacting said membrane with a non-volatile liquid which has a partial solubility for said thermoplastic resin, to one surface of said membrane under a heated state at a temperature not lower than 100° C. and cooling the other surface of said membrane, while said membrane is taken up at such a draw rate that a draft ratio defined below becomes not less than 1 and not higher than 12:

Draft ratio=(draw rate of membrane)/(discharge rate of composition at discharge opening); and (c) a step of removing substantial portion of said plasticizer and said non-volatile liquid.

[9] The method in accordance with the above described [8], wherein said composition comprising a thermoplastic resin and a plasticizer has a thermally induced solid-liquid phase separation point.

[10] The method in accordance with the above described [8] or [9], wherein said thermoplastic resin is a polyvinylidene fluoride resin.

[11] The method in accordance with the above described [10], wherein said plasticizer is at least one selected from the group consisting of dicyclohexyl phthalate, triphenyl phosphate, diphenylcresyl phosphate and tricresyl phosphate.

[12] The method in accordance with the above described [10], wherein said non-volatile liquid is at least one selected from the group consisting of phthalate esters adipate esters and sebacate esters whose ester chains have a carbon chain length not longer than 7, phosphate esters and citrate esters whose ester chains have a carbon chain length not longer than 8.

[13] The multilayer microporous membrane obtained by a method in accordance with any one of the above described [8]–[12].

[14] The multilayer microporous membrane in accordance with any one of the above described [1]–[7] and [13], wherein membrane surfaces and an inner surface of micropore thereof are hydrophilized.

[15] The multilayer microporous membrane in accordance with any one of the above described [1]–[7], [13] and [14], to be used for viral removal from a liquid containing physiologically active substances.

[16] Use of the multilayer microporous membrane in accordance with any one of the above described [1]–[7], [13] and [14] for viral removal from a liquid containing physiologically active substances.

[17] A method of viral removal from a liquid containing physiologically active substances, comprising use of the multiplayer microporous membrane in accordance with any one of the above described [1]–[7], [13] and [14].

BEST MODE FOR CARRYING OUT THE INVENTION

Shape of the microporous membrane of the present invention is a flat membrane type, a hollow fiber type and the like and any shape thereof is applicable, but a hollow fiber is preferable in view of easiness of manufacturing.

Thickness of the multilayer microporous membrane of the present invention is preferably 15–1,000 μm, more preferably 15–500 μm and most preferably 20–100 μm. A membrane thickness thinner than 15 μm is not preferable due to a tendency to exhibit an insufficient strength of the microporous membrane. A membrane thickness above 1,000 μm is also not preferable due to a tendency to exhibit an insufficient permeation performance.

It is essential for the microporous membrane of the present invention to have a coarse structure layer with a higher open pore ratio and a fine structure layer with a lower open pore ratio, as well as a multilayer structure wherein said coarse structure layer is present at least in one surface of the membrane. Said coarse structure layer is a portion having a relatively high open pore ratio in the whole membrane thickness, and enhances membrane processing ability by providing a pre-filtering function for suspended substances contained in a protein solution and the like. In addition, said fine structure layer is a portion having a relatively low open pore ratio in the whole membrane thickness, which substantially specifies the pore diameter of the membrane. In a microporous membrane intended for the purpose of removing minute particles such as viruses, this portion is a layer whose function is to entrap said minute particles.

Porosity and open pore ratio in the present invention are the same in fundamental concept, both corresponding to a volume ratio of void parts in a microporous membrane. However, the former is a value obtained from an apparent volume calculated based on a cross-sectional area and a length of membrane, a weight of said membrane and a true density of a membrane material itself, whereas the latter is a ratio of an area occupied by void parts to a cross-sectional area of a membrane, obtained by an image analysis of a photograph by electron microscope of a cross-section of the membrane. In the present invention, the latter is measured for each specified thickness along a thickness direction of the membrane, and is used to examine a variation in a volume ratio of void parts along a thickness direction of the membrane. The open pore ratio is measured for every 1 μm thickness in view of measurement accuracy for a membrane with the maximum pore diameter not more than 300 nm.

More specifically, open pore ratio was obtained by dividing an observed cross-sectional structure along a perpendicular direction against a membrane surface of the microporous membrane into regions with a 1 μm thickness each along a thickness direction, and then calculating a fraction of area occupied by voids in each divided region by an image analysis. An average open pore ratio is obtained by averaging an open pore ratio of each divided region for a certain range of membrane thickness, and average open pore ratio for the whole membrane thickness is obtained by averaging an open pore ratio obtained for each divided region for the whole membrane thickness.

Porosity of a microporous membrane of the present invention is preferably 30–90%, more preferably 40–85% and most preferably 50–80%. A porosity less than 30% is not preferable due to an insufficient filtration rate and a porosity above 90% is also not preferable due to not only loss of reliability in the removal of viruses and the like but also an insufficient strength of a microporous membrane.

Thickness of a coarse structure layer of the present invention is not less than 5.0 μm. A thickness of a coarse structure layer not less than 5.0 μm can exhibit a sufficient pre-filtering function. Thickness of a coarse structure layer is preferably not less than 7.0 μm and more preferably not less than 10.0 μm. In addition, a thickness of a fine structure layer occupies not less than 50% of the whole membrane thickness. A membrane with a thickness of fine structure layer not less than 50% of the whole membrane thickness can be used without lowering an removal performance for viruses and the like. It is preferably not less than 55% and more preferably not less than 60%.

Coarse structure layer in the present invention is a layer which is present adjacent to a membrane surface and has a higher open pore ratio measured along a thickness direction, and is a layer which has an open pore ratio (A) preferably not less than an average open pore ratio of the whole membrane thickness+2.0% [hereafter referred to as a coarse structure layer (A)], more preferably+2.5% and most preferably+ 3.0%. An upper limit of open pore ratio of a coarse structure layer is preferably not more than an average open pore ratio of the whole membrane thickness+30%, more preferably not more than an average open pore ratio of the whole membrane thickness+25% and most preferably not more than an average open pore ratio of the whole membrane thickness+ 20%. An open pore ratio of a coarse structure layer not less than an average open pore ratio of the whole membrane thickness+2.0% provides a sufficiently large structural difference from a fine structure layer, and can exhibit pre-filtering effects and enhance processing ability of microporous membrane. To the contrary, an open pore ratio of a coarse structure layer more than an average open pore ratio of the whole membrane thickness+30% is not preferable due to a coarser structure of the coarse structure layer than required and an insufficient pre-filtering function.

Coarse structure layer in the present invention has preferably a gradient structure with an open pore ratio continuously decreasing from a membrane surface toward a fine structure layer. As a reason for this preference, it is supposed that continuous decrease in a pore diameter together with continuous decrease in an open pore ratio allows removal of larger suspended substances at the vicinity of the surface as well as removal of smaller suspended substances at more inner zone stepwise, thus enhancing a pre-filtering function of a coarse structure layer. A discontinuous remarkable change in an open pore ratio at a boundary between a coarse structure layer and a fine structure layer is not preferable due to a decrease in filtering rate by an accumulation of suspended substances at the vicinity of the boundary. A gradient structure described herein with continuous decrease in an open pore ratio means a general tendency along a membrane thickness direction, and thus more or less a local inversion in an open pore ratio caused by structural inconsistency or measurement error may be present.

Coarse structure layer in the present invention preferably comprises a layer with an open pore ratio not less than an average open pore ratio of the whole membrane thickness+ 5.0%, more preferably comprises a layer with an open pore ratio not less than an average open pore ratio of the whole membrane thickness+8.0%. A coarse structure layer comprising a layer with an open pore ratio not less than an average open pore ratio of the whole membrane thickness+ 5.0% means to have a layer with a sufficiently larger pore diameter than a fine structure layer, allowing the coarse structure layer to exhibit a sufficient pre-filtering function. A layer with the maximum open pore ratio is preferably present at the membrane surface or at the vicinity thereof.

When the microporous membrane of the present invention is used for viral removal in a liquid, it is preferable that a skin layer is not present in the surface of said microporous membrane and the maximum pore diameter determined by the bubble point method is preferably not less than 10 nm, more preferably not less than 15 nm in view of a permeability of physiologically active substances such as globulin or a filtration rate. Presence of a skin layer may cause abrupt lowering of permeability due to an accumulation of suspended substances contained in a protein solution and the like on a surface. Skin layer herein means a layer which is present adjacent to a membrane surface and has a smaller pore diameter than in an inner region of membrane, and a thickness thereof is not more than 1 μm in general. Further, an upper limit of the maximum pore diameter determined by the bubble point method depends on the size of a target for removal such as viruses. However, it is preferably not more than 100 nm, more preferably not more than 70 nm and preferably not more than 50 nm in a particular case for removing small viruses. The maximum pore diameter herein is a value measured by the bubble point method in accordance with ASTM F316-86.

In said microporous membrane, an average pore diameter in the membrane surface, where a coarse structure layer is present adjacent thereto, is preferably at least two times of the maximum pore diameter determined by the bubble point method, more preferably at least three times of the maximum pore diameter determined by the bubble point method. An average pore diameter in the membrane surface, where a coarse structure layer is present adjacent thereto, less than two times of the maximum pore diameter determined by the bubble point method is not preferable, because the pore diameter is too small to prevent an accumulation of suspended substances on the surface and a decrease in filtration rate. When said microporous membrane is used for viral removal, an average pore diameter in a membrane surface, where a coarse structure layer is present adjacent thereto, is preferably not more than 3 μm, more preferably not more than 2 μm. Said average pore diameter over 3 μm is not preferable due to a tendency to lower a pre-filtering function.

In the present invention, fine structure layer is a layer with a lower open pore ratio, and is preferably a layer which has an open pore ratio (B) less than an average open pore ratio of the whole membrane thickness+2.0% and in the range of [an average value of an open pore ratio of a layer having an open pore ratio less than an average open pore ratio of the whole membrane thickness+2.0%]±2.0% (inclusive of both limits) [hereafter referred to as a fine structure layer (B)]. An open pore ratio of a fine structure layer in the range [an average value of an open pore ratio of a layer having an open pore ratio less than an average open pore ratio of the whole membrane thickness+2.0%]±2.0% (inclusive of both limits) means that a fine structure layer has a relatively homogeneous structure, which is important in removing viruses and the like by depth filtration. Higher homogeneity of a fine structure layer is more preferable, and variation range of an open pore ratio is preferably±2%, and more preferably±1%. Preferable example of a fine structure layer is the intraspherulitic void structure disclosed in WO 01/28667, and the like.

Another structural characteristic required for depth filtration is a number of filtration steps, which corresponds to a thickness of a fine structure layer in the present invention. A thickness of a fine structure layer is essentially not less than 50%, more preferably not less than 55%, and further more preferably not less than 60% of the whole membrane thickness. A thickness of a fine structure layer less than 50% of the whole membrane thickness is not preferable because the thickness may lower an removing performance for viruses, although it depends on membrane thickness.

In the microporous membrane of the present invention, an intermediate region may be present, which does not belong to either said coarse structure layer (A) or said fine structure layer (B). An intermediate region herein is a layer with an open pore ratio less than an average open pore ratio of the whole membrane+2.0% but out of the range of [an average value of an open pore ratio of a layer having an open pore ratio less than an average open pore ratio of the whole membrane thickness+2.0%]±2.0% (inclusive of both limits). Such a layer is generally present in a boundary part between a coarse structure layer (A) and a fine structure layer (B).

Further, in the microporous membrane of the present invention, a coarse structure layer and a fine structure layer are essentially formed in one-piece. One-piece formation of a coarse structure layer and a fine structure layer herein means that a coarse structure layer and a fine structure layer are simultaneously formed in manufacturing of a microporous membrane. In this case, an intermediate region may be present in a boundary part of a coarse structure layer and a fine structure layer. Therefore, a membrane manufactured by coating a layer with a relatively small pore diameter onto a supporting body with a large pore diameter and a membrane manufactured by laminating various membranes with different pore diameters are not included in the multilayer microporous membrane of the present invention. Membranes manufactured by coating or laminating various membranes with different pore diameters have such drawbacks that suspended substances tend to accumulate between a supporting body and coated layers, because connection of pores is lowered or a pore diameter varies drastically and discontinuously between two layers.

Water permeation rate of the microporous membrane of the present invention varies depending on pore diameter, but is preferably from $2 \times 10^{-11}$ to $3 \times 10^{-8}$, more preferably from $5 \times 10^{-11}$ to $1.5 \times 10^{-8}$ and most preferably from $8 \times 10^{-11}$ to $8.5 \times 10^{-9}$. Said water permeation rate is a converted value to a rate for a membrane thickness of 25 µm in units of $m^3/m^2/sec/Pa/25$ µm. A water permeation rate less than $2 \times 10^{-11}$ is not preferable because a practical water permeation rate cannot be obtained as a separation membrane. Further, a water permeation rate over $3 \times 10^{-8}$ cannot be practically obtained in consideration of maintaining strength of microporous membrane or reliability of viral removal.

Tensile break strength of the microporous membrane of the present invention is preferably from $1 \times 10^6$ to $1 \times 10^8$ $N/m^2$, more preferably from $1.5 \times 10^6$ to $8 \times 10^7$ $N/m^2$ and most preferably from $2 \times 10^6$ to $5 \times 10^7$ $N/m^2$ at least in one axial direction. A tensile break strength below $1 \times 10^6$ $N/m^2$ is not preferable because it tends to cause troubles in microporous membrane such as damages by bending, friction and foreign matters or a rupture by a pressure applied at filtration. To the contrary, a tensile break strength over $1 \times 10^8$ $N/m^2$ has no particular problem, however, such strong microporous membrane is practically difficult to be manufactured.

Tensile break elongation of the microporous membrane of the present invention is preferably from 10 to 2,000%, more preferably from 20 to 1,500% and most preferably from 30 to 1,000% at least in one axial direction. A tensile break elongation below 10% is not preferable because it tends to cause troubles in the microporous membrane such as damages by bending, friction and foreign matters or a rupture by a pressure applied at filtration. To the contrary, a tensile break elongation over 2,000% has no particular problem. However, such microporous membrane is practically difficult to be manufactured.

The microporous membrane of the present invention contains thermoplastic resin and a ratio of said thermoplastic resing in the membrane is preferably not less than 50% by weight, more preferably not less than 70% by weight and most preferably not less than 80% by weight based on the total resin amount. A ratio of a thermoplastic resin in a membrane less than 50% by weight based on the total resin amount is not preferable because it causes problems such as a decreased mechanical strength of membrane.

Thermoplastic resins used to manufacture the microporous membrane of the present invention are crystalline thermoplastic resin used in conventional compression, extrusion, injection, inflation and blow moldings, and includes polyolefin resins such as polyethylene resin, polypropylene resin and poly(4-methyl-1-pentene) resin; polyester resins such as poly(ethylene terephthalate) resin, poly(butylene terephthalate) resin, poly(ethylene terenaphthalate) resin, poly(butylene naphthalate) resin and poly(cyclohexylenedimethylene terephthalate) resin; polyamide resins such as nylon 6, nylon 66, nylon 610, nylon 612, nylon 11, nylon 12 and nylon 46; fluororesins such as polyvinylidene fluoride resin, ethylene/tetrafluoroethylene resin and poly(chlorotrifluoroethylene) resin; polyphenylene ether resins; polyacetal resins and the like.

In addition, in view of a thermal resistance required for applying a steam sterilization, at least one kind of thermoplastic resins constituting the microporous membrane of the present invention is a thermoplastic resin having a crystal melting point preferably at 140–300° C., more preferably at 145–250° C. and most preferably at 150–200° C. Further, in order to attain a thermal resistance of a membrane itself in blending with a resin having a crystal melting point lower than 140° C., an amount of a thermoplastic resin having a crystal melting point at 140–300° C. is preferably not less than 50% by weight, more preferably not less than 70% by weight and further more preferably not less than 80% by weight based on the total resin amount.

Blending at least one type of thermoplastic resin having a crystal melting point at 140–300° C. can give a thermal resistance for a steam sterilization process suitably adopted in applications to a medical separation membrane or a high temperature filtration process required as an important performance in other industrial applications, to a microporous membrane. On the other hand, use of a thermoplastic resin having a crystal melting point over 300° C. makes it difficult to homogeneously dissolve the resin and a plasticizer by heating in a manufacturing method of the present invention, and thus deteriorates processability.

Among said thermoplastic resins, polyvinylidene fluoride resins are particularly preferable due to a good balance between thermal resistance and processability. Polyvinylidene fluoride resin described herein means a fluororesin containing a vinylidene fluoride unit in a basic backbone, and is a resin called, in general, as PVDF in abbreviation. As these polyvinylidene fluoride resins, a homopolymer of vinylidene fluoride (VDF) and copolymers of vinylidene fluoride (VDF) with one or two kinds of monomers selected from the monomer group of hexafluoropropylene (HFP), pentafluoropropylene (PFP), tetrafluoroethylene (TFE), chlorotrifluoroethylene (CTFE) and perfluoromethylvinyl ether (PFMVE) can be used. Said homopolymer can also be used by blending with said copolymer. In the present invention, use of a polyvinylidene fluoride resin containing 30–100% by weight of the homopolymer is preferable due to an improved crystallinity and a high strength of microporous membrane, and use of homopolymer alone is more preferable.

The microporous membrane of the present invention may be hydrophilic or hydrophobic. However, for a filtration of a solution containing physiologically active substances such as proteins, a membrane surface or a micropore surface is preferably hydrophilic. Generally, a degree of hydrophilic nature can be evaluated by a contact angle. An average value of advancing contact angle and regressive contact angle at 25° C. is preferably not more than 60 degrees, more preferably not more than 45 degrees and most preferably not more than 30 degrees. As a simple evaluation method, if water penetrates spontaneously into a pore when a microporous membrane is contacted with water, the microporous membrane can be judged as sufficiently hydrophilic.

An average molecular weight of a thermoplastic resin used in the present invention is preferably 50,000–5,000, 000, more preferably 100,000–2,000,000 and most preferably 150,000–1,000,000. Said molecular weight means a weight average molecular weight obtained by a measurement by gel permeation chromatography (GPC). For a resin with a molecular weight above 1,000,000, since it is, in general, difficult to perform an accurate GPC measurement, a viscosity average molecular weight by a viscosity method can be adopted as an alternative. An average molecular weight smaller than 50,000 is not preferable due to a lower melt tension in a melt processing resulting in a poor processability or a lower mechanical strength of membrane. An average molecular weight larger than 5,000,000 is not preferable due to a difficulty in homogeneous melt mixing.

A typical manufacturing method for a microporous membrane of the present invention will be described hereinbelow.

A typical manufacturing method for the microporous membrane of the present invention comprises the following (a)–(c) steps:

(a) a steps of forming a membrane by heating a composition comprising a thermoplastic resin and a plasticizer at a temperature not lower than crystal melting point of said thermoplastic resin to homogeneously dissolve them and then extruding said composition from a discharge opening;

(b) a step of forming a coarse structure layer and a fine structure layer by contacting said membrane with a non-volatile liquid which has a partial solubility for said thermoplastic resin, to one surface of said membrane under a heated state at a temperature not lower than 100° C. and cooling the other surface of said membrane, while said membrane is taken up at such a draw rate that a draft ratio defined below becomes not less than 1 and not higher than 12:

Draft ratio=(draw rate of membrane)/(discharge rate of composition at discharge opening); and (c) a step of removing substantial portion of said plasticizer and said non-volatile liquid.

Polymer concentration of a thermoplastic resin used in the present invention is preferably 20–90% by weight, more preferably 30–80% by weight and most preferably 35–70% by weight in a composition containing a thermoplastic resin and a plasticizer. A polymer concentration lower than 20% by weight results in disadvantages such as lowered membrane forming property and insufficient mechanical strength. Further, as a virus removal membrane, a pore diameter of a microporous membrane obtained becomes too large resulting in an insufficient viral removal performance. A polymer concentration over 90% by weight makes a pore diameter as well as a porosity of a microporous membrane obtained too small, and thus lowers filtration rate to an impractical level.

As a plasticizer used in the present invention, a non-volatile solvent is used which can form a homogeneous solution at a temperature not lower than crystal melting point of a resin in mixing with a thermoplastic resin in a composition to manufacture a microporous membrane. A non-volatile solvent mentioned herein is a solvent having a boiling point not lower than 250° C. under the atmospheric pressure. Form of a plasticizer may be liquid or solid at around an ambient temperature of 20° C. In order to manufacture a membrane having a small pore diameter and a homogeneous fine structure layer to be used for viral removal, use of a so-called "solid-liquid phase separation" type of plasticizer is preferable such as a plasticizer having a thermally induced type solid-liquid phase separation point at a temperature not lower than the ambient temperature in cooling a homogeneous solution with a thermoplastic resin.

Among them, although some plasticizers have a thermally induced liquid—liquid phase separation point at a temperature not lower than the ambient temperature in cooling a homogeneous solution with a thermoplastic resin, use of the liquid—liquid phase separation type of plasticizer generally tends to make a pore diameter of a microporous membrane obtained larger. A plasticizer herein may be used in single or as a mixture of a plurality of substances.

Thermally induced solid-liquid phase separation point can be determined by measuring an exothermic peak temperature of said resin by a thermal analysis (DSC), using a sample prepared in advance by melt mixing a composition containing specified concentrations of a thermoplastic resin and a plasticizer. Further, a crystallization point of said resin can be determined similarly by a thermal analysis using a sample prepared in advance by melt mixing said resin.

Plasticizers preferable in manufacturing a membrane having a small pore diameter and a homogeneous fine structure layer to be used for viral removal include those disclosed in WO 01/28667. That is, they are a plasticizer having a phase separation point depression constant a of a composition, defined below, of 0–40° C., preferably a plasticizer having the constant of 1–35° C. and more preferably a plastisizer having the constant of 5–30° C. A phase separation point depression constant over 40° C. is not preferable due to reduced uniformity of pore diameter or lower strength.

$$\alpha = 100 \times (T_c^0 - T_c) \div (100 - C)$$

[wherein, $\alpha$ is a phase separation point depression constant (°C.), $T_c^0$ is a crystallization point of a thermoplastic resin, $T_c$ is a thermally induced solid-liquid phase separation point (°C.) and C is a concentration of a thermoplastic resin in a composition (% by weight)].

For example, when polyvinylidene fluoride resin is selected as a thermoplastic resin, a particularly preferable plsticizer is dicyclohexyl phtharate (DCHP), triphenyl phosphate (TPP), diphenylcresyl phosphate (CDP) and tricresyl phosphate (TCP).

The first method for homogeneously dissolving a composition containing a thermoplastic resin and a plasticizer in the present invention comprises introducing said resin into a continuous resin kneading apparatus such as an extruder and then introducing a plasticizer in certain ratio, as heat-melting the resin to carry out screw kneading of them, thereby obtaining a homogeneous solution. Shape of the resin charged may be any of powder, granule or pellet. Shape of the plasticizer is preferably liquid at an ambient temperature in a case to dissolve homogeneously by such a method. As an extruder, a single screw type extruder, a counter-rotating twin screw type extruder and a co-rotating twin screw type extruder can be used.

The second method for homogeneously dissolving a composition containing a thermoplastic resin and a plasticizer comprises pre-mixing and dispersing a resin and a plasticizer using an agitator such as a Henschel mixer, and introducing the thus obtained composition into a continuous resin kneading apparatus such as an extruder to knead the composition, thereby obtaining a homogeneous solution. Shape of a composition introduced may be slurry in the case of the plasticizer being liquid at an ambient temperature, and powder or granule in the case of the plasticizer being a solid at an ambient temperature.

The third method for homogeneously dissolving a composition containing a thermoplastic resin and a plasticizer is a method to use a simple resin kneading apparatus such as Brabender or mill, or a method to perform melt kneading in other batch type kneading containers. This method, although not good in productivity due to a batch process, has advantages such as simplicity and high flexibility.

In the present invention, a composition containing a thermoplastic resin and a plasticizer is heated at a temperature not lower than a crystal melting point of a thermoplastic resin, followed by being extruded from a discharge opening of a T-die, a circular die or circular spinneret into a shape such as a flat membrane or a hollow fiber in the step (a), and then transferred to the step (b) for cooling and solidification to make a formed product, in which a fine structure layer is formed as well as a coarse structure layer is formed adjacent to a membrane surface.

In the present invention, a homogeneously heated and dissolved composition containing a thermoplastic resin and a plasticizer is extruded from a discharge opening, and a coarse structure layer and a fine structure layer are formed by contacting said membrane with a non-volatile liquid, which has a partial solubility for said thermoplastic resin, in one surface of a membrane under a heated state at a temperature not lower than 100° C. and cooling the other surface of a membrane, while said membrane is drawn at such a draw rate that a draft ratio defined below becomes not less than 1 and not higher than 12;

Draft ratio=(draw rate of membrane)/(discharge speed of composition at discharge opening).

Said draft ratio is preferably not lower than 1.5 and not higher than 9, more preferably not lower than 1.5 and not higher than 7. A draft ratio below 1 lowers processability because no tension is given to a membrane, and a draft ratio above 12 makes difficult to form a coarse structure layer with a sufficient thickness because a membrane is extended too much. An extrusion rate of a composition at a discharge opening herein is given by the following equation:

Extrusion rate of composition at discharge opening= (volume of composition extruded per unit time)/ (area of discharge opening)

A range of extrusion rate is preferably 1–60 m/min, more preferably 3–40 m/min. An extrusion rate less than 1 m/min causes problems such as lowering of productivity and an increased fluctuation in an extrusion amount. To the contrary, an extrusion rate over 60 m/min may cause turbulence at a discharge opening due to an extrusion amount that is too large, resulting in instability of an extrusion state.

Draw rate can be set depending on an extrusion rate but is preferably 1–200 m/min, more preferably 3–150 m/min. A draw rate less than 1 m/min lowers productivity and membrane forming property, whereas a draw rate over 200 m/min tends to cause a membrane fracture due to a shorter cooling time and a larger tension given to a membrane.

A preferable method for forming a coarse structure layer is a method to extrude a composition containing a thermoplastic resin and a plasticizer from an discharge opening into a flat membrane or a hollow fiber like membrane, then to contact at least one surface of an unhardened membrane thus formed with a non-volatile liquid which has a partial solubility to a thermoplastic resin. In this method, a coarse structure layer is formed by a diffusion of a liquid contacted into an inside of membrane and a partial dissolution of a thermoplastic resin. A liquid which has a partial solubility to a thermoplastic resin herein is a liquid which can form a homogeneous solution only at a temperature not lower than 100° C., when mixed with a thermoplastic resin in a concentration of 50% by weight, and preferably a liquid which can form a homogeneous solution at a temperature not lower than 100° C. and not higher than 250° C., and more preferably a liquid which can form a homogeneous solution at a temperature not lower than 120° C. and not higher than 200° C. Use of a liquid which homogeneously dissolves at a temperature below 100° C. as a contacting liquid, may cause disadvantages such as lowering of membrane forming property due to insufficient cooling and solidification of a solution of a composition containing a thermoplastic resin and a plasticizer, an increased thickness of a coarse structure layer more than required and a too large pore diameter. A liquid which can not form a homogeneous solution at a temperature below 250° C. makes difficult to form a coarse structure layer with a sufficient thickness due to a lower solubility to a thermoplastic resin. In addition, a non-volatile liquid described herein is a liquid having a boiling point above 250° C. under 1 atmosphere of pressure.

For example, when polyvinylidene fluoride resins are selected as a thermoplastic resin, preferably phthalate esters, adipate esters and sebacate esters whose ester chains have a carbon chain length not longer than 7, and phosphate esters and citrate esters whose ester chains have a carbon chain length not longer than 8 can be used; and diheptyl phthalate, dibutyl phthalate, diethyl phthalate, dimethyl phthalate, dibutyl adipate, dibutyl sebacate, tri(2-ethylhexyl) phosphate, tributyl phosphate and tributyl acetyl citrate are particularly preferable. However, a plasticizer whose ester chain has a cyclic structure such as phenyl, cresyl or cyclohexyl group, for example, dicyclohexyl phthalate (DCHP), triphenyl phosphate (TPP), diphenylcresyl phosphate (CDP) and tricresyl phosphate (TCP) and the like is exceptionally not preferable, because such plasticizer has less ability to form a coarse structure layer.

Temperature of a contacting liquid used to introduce a coarse structure layer is not lower than 100° C., preferably not lower than 120° C. and not higher than a temperature of a homogeneous solution of a thermoplastic resin and a plasticizer, more preferably not lower than 130° C. and not higher than [a temperature of a homogeneous solution of a thermoplastic resin and a plasticizer–10° C.]. A temperature of said contacting liquid below 100° C. tends to make if difficult to form a coarse structure layer with a sufficient thickness due to a lower solubility to a thermoplastic resin. A temperature over [a temperature of a homogeneous solution of a thermoplastic resin and a plasticizer] lowers a membrane forming property.

When a coarse structure layer is introduced only in one surface of a microporous membrane, a cooling method of the other surface, which corresponds to a side of a fine structure layer, can be in accordance with conventional methods. That is, a method to cool down by contacting with a heat conductive body can be used. As a heat conductive body, metal, water, air or a plasticizer itself can be used. More specifically, such a method for introducing a coarse structure layer is possible as extruding a homogeneous solution containing a thermoplastic resin and a plasticizer through a T-die and the like as a sheet, cooling by contacting with a metal roll and contacting the other surface of membrane, which does not contact with a roll, with a non-volatile liquid having a partial solubility to a thermoplastic resin. Alternatively, such a method is also possible as extruding a homogeneous solution containing a thermoplastic resin and a plasticizer from a circular die or a circular spinneret in a tubular or hollow fiber like form, passing a non-volatile liquid having a partial solubility to a thermoplastic resin through inside of said tube or hollow fiber to form a coarse structure layer in an inner surface side, and cooling an outside by contacting with a cooling medium such as water.

When coarse structure layers are introduced in both surfaces of a microporous membrane, a homogeneous solution containing a thermoplastic resin and a plasticizer is extruded from a T-die, a circular die or a circular spinneret in a specified shape, then contacted in both surfaces of said solution with a non-volatile liquid having a partial solubility to a thermoplastic resin to form coarse structure layers, thereafter cooled and solidified. A cooling method in this process can be in accordance with conventional methods. If a time from contacting with a non-volatile liquid having a partial solubility to a thermoplastic resin to starting to cool becomes longer, disadvantages may arise such as a lowered membrane forming property and a lowered membrane strength. Therefore, the time from contacting with a liquid to starting to cool is preferably not longer than 30 seconds, more preferably not longer than 20 seconds and most preferably not longer than 10 seconds.

In a manufacturing method for the microporous membrane of the present invention, cooling rate in cooling and solidification is preferably sufficiently fast to form a uniform fine structure layer with a small pore diameter. Cooling rate is preferably not slower than 50° C./min, more preferably 100–1×10$^{5}$° C./min and further more preferably 200–2×10$^{4}$° C./min. More concretely, a method to contact with a metal-made chill roll or water is suitably used, and in particular, contacting with water is a preferable method because rapid cooling can be attained by an evaporation of water.

In the present invention, an extraction solvent is used to remove a plasticizer. Preferably, an extraction solvent is a poor solvent for a thermoplastic resin and a good solvent for a plasticizer as well as having a boiling point lower than the melting point of a microporous membrane. Such an extraction solvent includes hydrocarbons such as hexane and cyclohexane; halogenated hydrocarbons such as methylene chloride and 1,1,1-trichloroethane; alcohols such as ethanol and isopropanol; ethers such as diethyl ether and tetrahydrofurane; ketones such as acetone and 2-butanone; and water.

The first method for removing a plasticizer in the present invention is done by immersing a microporous membrane cut out into a specified size into a vessel containing an extraction solvent, washing it sufficiently, then drying adhered solvent by air drying or hot air drying. Repeated operations of such immersion and washing are preferable to reduce residual plasticizer in a microporous membrane. It is preferable to fix both ends of a microporous membrane during a series of operations of immersion, washing and drying to suppress shrinkage of microporous membrane.

The second method for removing a plasticizer in the present invention is done by continuously feeding a microporous membrane into a tank filled with an extraction solvent, immersing in a tank in sufficient time to remove a plasticizer, then drying adhered solvent. In this process, it is preferable, for improving an extraction efficiency, to adopt well known means such as a multistage method in which the inside of a tank is divided into a plurality of small tanks and a microporous membrane is fed sequentially into the small tanks with decreasing concentrations, or a counter-flow method in which an extraction solvent is fed against a running direction of a microporous membrane to obtain a gradient concentration. In both the first and the second methods, it is important to substantially remove a plasticizer from a microporous membrane. "Substantially remove" herein means to remove a plasticizer in a microporous membrane to such a degree as not to impair a performance as a separation membrane. A residual amount of a plasticizer in a microporous membrane is preferably not more than 1% by weight, and more preferably not more than 100 ppm by weight. A residual amount of a plasticizer in a microporous membrane can be quantitatively determined by gas chromatography or liquid chromatography. It is also preferable to heat an extraction solvent at a temperature within the range below a boiling point of said solvent, preferably below a boiling point –5° C., to accelerate diffusions of a plasticizer and a solvent and thus improve extraction efficiency.

In the present invention, if a heat treatment is applied to a microporous membrane before, after or before and after the step of removing a plasticizer, such effects can be obtained as a reduced shrinkage during a removal process of a plasticizer and improvements in membrane strength and heat resistance. Method for heat treatment includes placing a microporous membrane in hot air, immersing a microporous membrane in a heating medium and contacting a microporous membrane with a metal roll at an elevated and regulated temperature. A heat treatment under a state of fixed dimension is preferable to prevent particularly collapsing of micropores.

Temperature for heat treatment varies depending on an object or a melting point of a thermoplastic resin, but for a polyvinylidene fluoride membrane used for viral removal, the temperature is preferably 121–170° C., and more preferably 125–165° C. A temperature of 121° C. is generally adopted as a temperature for high pressure steam sterilization and a heat treatment at a temperature not lower than this makes it possible to prevent shrinkage or deformation during a high pressure steam sterilization. A temperature above 170° C. may cause problems such as a membrane fracture and collapsing of micropores during a heat treatment, because the temperature is close to a melting point of polyvinylidene fluoride.

When the microporous membrane of the present invention is used for an application of viral removal, it becomes necessary to provide a hydrophilic nature to a membrane to prevent clogging caused by adsorption of proteins. Method for hydrophilization includes, for example, immersing a microporous membrane in a solution containing a surfactant, followed by drying and allowing a surfactant to remain in a microporous membrane; grafting of a hydrophilic acrylic monomer, methacrylic monomer or the like onto a pore surface of a microporous membrane by irradiating an actinic radiation such as electron beam or gamma ray or by using a peroxide; blending a hydrophilic polymer in membrane formation in advance; and immersing a microporous membrane in a solution containing a hydrophilic polymer, followed by drying to make a coated film of a hydrophilic polymer on a pore surface of a microporous membrane. The grafting method is most preferable in view of durability of a hydrophilic property or possible risk of leakage of hydrophilic additives. In particular, a hydrophilization treatment by a radiation-induced graft polymerization method disclosed in JP-A-62-179540, JP-A-62-258711 and U.S. Pat. No. 4,885,086 is preferable in view of forming an uniform hydrophilic layer in an inner surface of micropores in the whole region of membrane.

A hydrophilization treatment by a radiation-induced graft polymerization method herein comprises a step of generating radicals in a resin consisting microporous membrane and a step of contacting a microporous membrane with hydrophilic monomer(s). Either a method of generating radicals and then contacting with hydrophilic monomers or a method of reverse order thereof is possible, but the method of generating radicals and then contacting with hydrophilic monomers is preferable from the viewpoint that less free oligomer is formed from hydrophilic monomer(s).

In contacting a microporous membrane with hydrophilic monomer(s), hydrophilic monomer(s) may be any state of gas, liquid or solution, but a liquid or a solution state is preferable, and a solution state is particularly preferable in order to form a uniform hydrophilized layer.

As a hydrophilic monomer, acrylic and methacrylic monomers having sulfone group, carboxylic group, amide group and neutral hydroxyl group can be suitably used, but monomers with a neutral hydroxyl group are particularly preferable in filtering a solution containing proteins. Further, in grafting hydrophilic monomer(s), an addition of a monomer having two or more vinyl groups as a crosslinking agent is preferable to suppress swelling of a hydrophilized layer.

In the present invention, an additional treatment may further be carried out so long as not to impair the microporous membrane of the present invention. The additional treatment includes a crosslinking treatment by an ionizing radiation and the like and an introduction of a functional group using a chemical modification of surface.

In a composition used in the present invention, additional additives may further be mixed depending on an object, such as antioxidant, crystal nucleating agent, antistatic agent, flame retardant, lubricant and UV absorbing agent.

The microporous membrane with heat resistance of the present invention can be utilized in a wide range of applications such as a separation membrane for medical use for removal of viruses and bacteria, thickening or culture medium; a filter for industrial process to remove minute particles from chemicals, treated water or the like; a separation membrane for an oil/water separation or a liquid/gas separation; a separation membrane for purification of water supply and sewage; a separator for lithium ion battery and the like; and a solid electrolyte supporting body for polymer cell, and the like.

The present invention will be described in detail by using Examples. Test methods shown in Examples are as follows:

(1) Outer Diameter, Inner Diameter and Membrane Thickness of a Hollow Fiber

Outer diameter and inner diameter of hollow fiber like microporous membrane were determined by photographing a vertically cut cross-section of said membrane using a stereoscopic microscope. A membrane thickness was calculated as ½ of a difference between an outer diameter and an inner diameter of a hollow fiber.

(2) Porosity

Porosity was calculated using the following equation from measurement results of a volume and a weight of a microporous membrane.

Porosity(%)=[1−weight÷(resin density×volume)]×100

(3) Water Permeation Rate

Water permeation amount for pure water was measured at 25° C. by a dead end filtration under a constant pressure. Water permeation rate was calculated using the following equation based on a membrane surface area, a filtration pressure (0.1 MPa), a filtration time and a membrane thickness.

Water permeation rate (m$^3$/m$^2$/sec/Pa/25 μm)=permeation amount÷[membrane surface area×pressure difference×filtration time×(25 μm/membrane thickness)]

(4) Maximum Pore Diameter

Maximum pore diameter (nm) was obtained by a conversion of bubble point (Pa) determined by the bubble point method in accordance with ASTM F316-86. A fluorocarbon liquid with a surface tension of 12 mN/m (Perfluorocarbon coolant FX-3250 (tradename) made by Sumitomo 3M Ltd.) was used as a test solution for immersing a membrane.

(5) Tensile Break Strength and Tensile Break Elongation

Tensile test was conducted using "Autograph Model AG-A" made by Shimadzu Corp. under the conditions of test piece length: 100 mm; distance between chucks (gauge length): 50 mm; cross head speed: 200 mm/min; and measurement temperature: 23±2° C. Tensile break strength and tensile break elongation were calculated by the following equations from a load at break, a strain at break and a cross-sectional area of membrane.

Tensile break strength (N/m$^2$)=load at break÷cross-sectional area of membrane

Tensile break elongation (%)=(strain at break÷distance between chucks)×100

(6) Structural Observation of a Microporous Membrane

A microporous membrane cut out in an appropriate size was fixed on a sample holder using an electrically conductive both-side adhesive tape, and coated with gold to provide a sample for observation. Structural observation was conducted on a surface and a cross-section of a microporous membrane using a high resolution scanning electron microscope (HRSEM) under an acceleration voltage of 5.0 kV and a specified magnification.

(7) Open Pore Ratio and Average Open Pore Ratio

As described above, open pore ratio was obtained by dividing an observation result of cross-sectional structure along a vertical direction against a membrane surface of a microporous membrane into regions with a 1 μm thickness each along a thickness direction, and then calculating a fraction of area occupied by voids in each divided region by an image analysis. In this procedure, photographing by an electron microscope was conducted at 15,000 magnifications. Average open pore ratio is an average value of open pore ratios for regions in a certain membrane thickness.

(8) Thickness of a Coarse Structure Layer and Ratio of a Fine Structure Layer to the Whole Membrane Thickness In the above described measurement of open pore ratio, it was judged whether each divided region met the definitions of a fine structure layer and a coarse structure layer defined in the present specification. That is, a coarse structure layer is a continuous region which is present adjacent to a membrane surface and has an open pore ratio measured along a thickness direction not less than 2% larger than an average open pore ratio for the whole membrane thickness. A fine structure layer is a region other than a coarse structure layer, which has an open pore ratio measured along a thickness direction within a range less than an average open pore ratio for a region excluding the coarse structure layer ±2%. A ratio of a fine structure layer to the whole membrane thickness is a value obtained by summing up a thickness of each satisfying divided region and then dividing the sum by the whole membrane thickness.

(9) Average Pore Diameter of a Surface in a Coarse Structure Layer Side

The number and an area of pores present in a surface were measured by an image analysis from structural observation results on a surface in a coarse structure layer side. A circle equivalent diameter was obtained from an average area per pore, assuming each pore as a circle. This circle equivalent diameter was used as an average pore diameter of a surface in a coarse structure layer side. Photographing by an electron microscope for this measurement was conducted at 6,000 magnifications.

(10) Cooling Rate

In a cooling and solidifying step, a cooling rate in a case of a coolant bath such as water was determined as follows using an infrared thermometer. A colorless transparent composition in a molten state was cooled with cold air, and a solidification temperature was determined by measuring a temperature of the composition using a infrared thermometer when the composition began to whiten by crystallization and solidification. Then, said composition was introduced into a coolant bath to be cooled and solidified, and a temperature of the composition just before contacting with the coolant bath was measured using an infrared thermometer, as an initial temperature. Then, a solidification time was measured as a period from a time when said composition contacted with the coolant bath to a time when said composition whitened by cooling and solidifying. A cooling rate was calculated according to the following equation:

Cooling rate (°C./min)=60×(initial temperature−solidification temperature)÷solidification time(sec)

(11) Filtration Test of a 3% Solution of Bovine Immunoglobulin

A bovine immunoglobulin solution which was made by Life Technology Co. Ltd. was diluted to 3% by weight with physiological saline (made by Otsuka Pharmaceutical Co. Ltd.) specified by Japanese Pharmacopoeia and then prefiltered with PLANOVA 35N made by Asahi Kasei Corp. to remove foreign materials was used as a test liquid for filtration. As a result of a measurement of a molecular weight distribution for the bovine immunoglobulin in said test liquid for filtration by a liquid chromatography, it was found that a ratio of multimers such as dimer or more was 20%. Said test liquid for filtration was filtered by a dead end filtration under a filtration pressure of 0.3 MPa and a filtration temperature at 25° C. to measure an integrated permeation amount for a filtration time of 3 hours and permeation rates at 5 min., 30 min. and 60 min. after starting the filtration.

EXAMPLE 1

Figure 1:
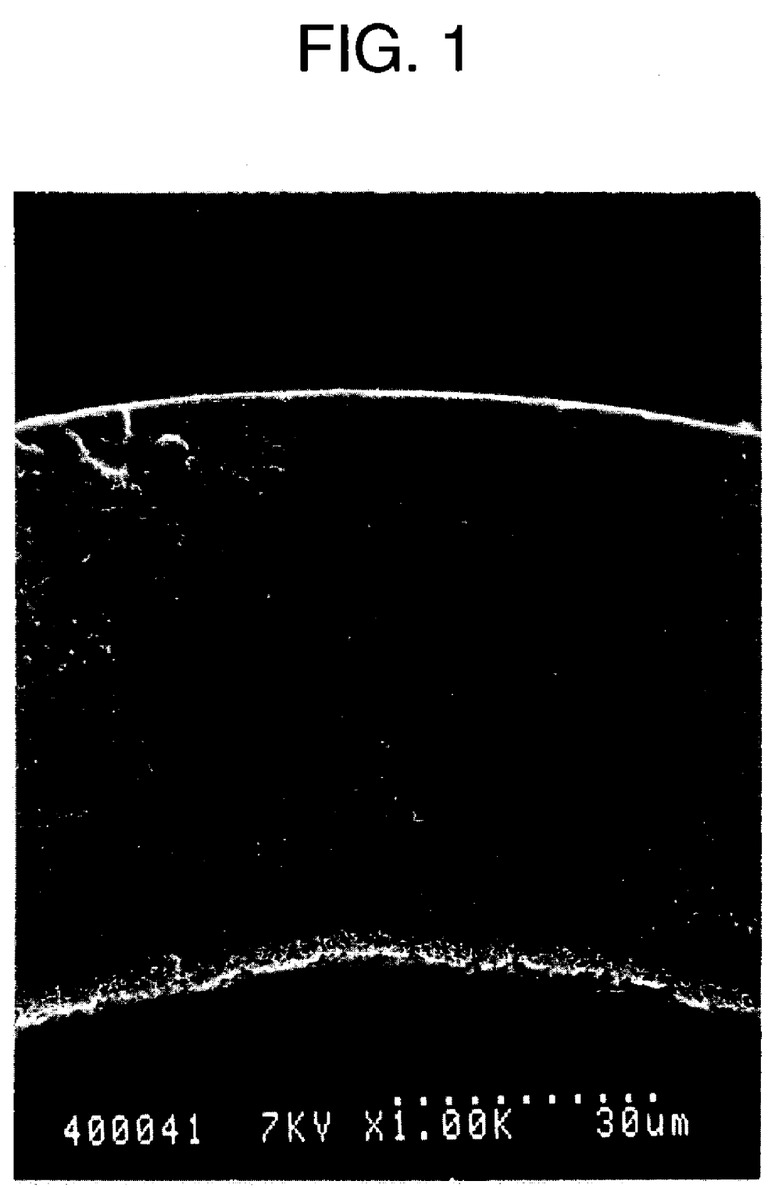
FIG. 1 is a photograph by scanning electron microscope of a cross-section of a hollow fiber like membrane obtained in Example 1, observed at 1,000 magnifications.
Figure 2:
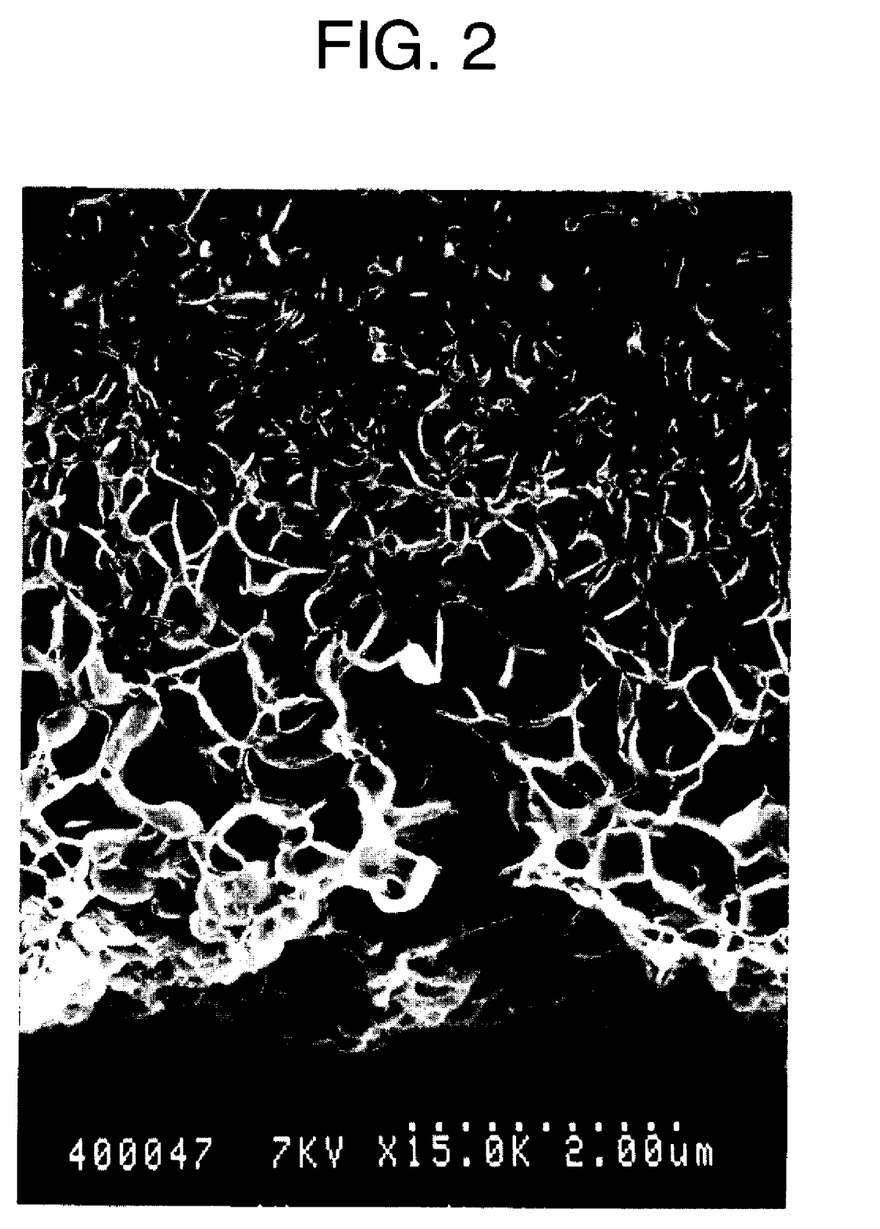
FIG. 2 is a photograph by scanning electron microscope of an inner surface vicinity of a hollow fiber like membrane obtained in Example 1, observed at 15,000 magnifications.
Figure 3:
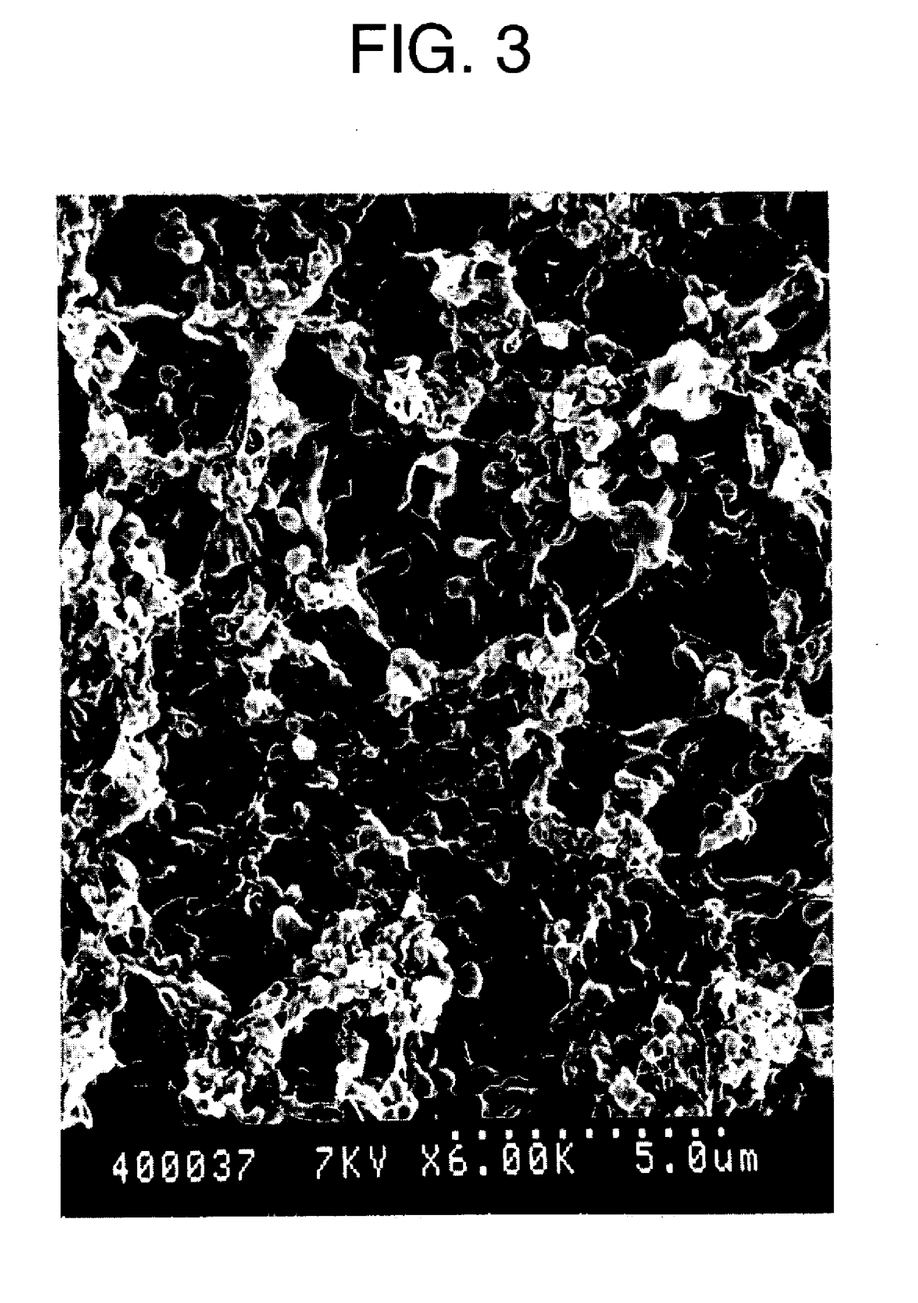
FIG. 3 is a photograph by scanning electron microscope of an inner surface (coarse structure layer side) of a hollow fiber like membrane obtained in Example 1, observed at 6,000 magnifications.

A composition consisting of 44% by weight of a polyvinylidene fluoride resin (SOFEF1012 made by SOLVAY, crystal melting point of 173° C.) and 56% by weight of dicyclohexyl phthalate (made by Osaka Org. Chem. Ind. Ltd., industrial grade) was mixed under an agitation using a Henschel mixer at 70° C., followed by cooling to obtain a powder-like material, which was charged to a hopper of twin screw extruder (Laboplastmill Model 50C 150 made by Toyo Seiki Seisaku-Syo, Ltd.) and melt mixed at 210° C. to attain a homogeneous dissolution. Subsequently, the composition was extruded in a form of a hollow fiber from a spinneret consisting of a circular orifice with an inner diameter of 0.8 mm and an outer diameter of 1.2 mm at an extrusion rate of 12 m/min, while diheptyl phthalate (made by Sanken Chem. Co., Ltd.) was fed at 130° C. into a hollow part at a rate of 7 ml/min. The extrudate was cooled and solidified in a water bath thermo-controlled at 40° C., and wound up on a hank at a rate of 60 m/min (a draft ratio of 5 times). Thereafter, dicyclohexyl phthalate and diheptyl phthalate were removed by an extraction with 99% methanol denaturated ethanol (made by Imazu Chem. Co., Ltd., industrial grade) and adhered ethanol was replaced with water. The resultant membrane was then thermally treated at 125° C. for 1 hour using high pressure steam sterilization equipment (HV-85 made by Hirayama Seisaku-Syo Co., Ltd.) in immersed state in water. The membrane was fixed at a constant length during the thermal treatment to prevent shrinkage. After that, the membrane was dried in an oven at 110° C. to obtain a hollow fiber like microporous membrane. A maximum pore diameter of the thus obtained microporous membrane was 40 nm, and observation results of a cross-sectional structure of the membrane by a scanning electron microscope showed that a thickness of a coarse structure layer formed adjacent to an inner surface side was 12 μm and a ratio of a fine structure layer to the whole membrane thickness was 82%. A whole image of cross-section, a magnified photograph of the vicinity of an inner surface and a photograph of an inner surface in a coarse structure layer side of the hollow fiber like membrane are shown in FIG. 1, FIG. 2 and FIG. 3, respectively. An open pore ratio for each divided region of 1 μm thickness along a thickness direction from an inner surface side of the microporous membrane and physical properties of said microporous membrane are shown in Table 1 and Table 2, respectively.

EXAMPLE 2

A hollow fiber like microporous membrane was obtained in accordance with Example 1 except that a polyvinylidene fluoride resin and dicyclohexyl phthalate were melt mixed to get a homogeneously dissolved solution, which was extruded in a form of hollow fiber from a spinneret at an extrusion rate of 9.5 m/min (a draft ratio of 6.3 times). A maximum pore diameter of thus obtained microporous membrane was 40 nm, and observation results of a cross-sectional structure of the membrane by a scanning electron microscope showed that a thickness of a coarse structure layer formed adjacent to an inner surface side was 9 μm and a ratio of a fine structure layer to the whole membrane thickness was 82%. Physical properties of this microporous membrane are shown in Table 2.

EXAMPLE 3

A hollow fiber like microporous membrane was obtained in accordance with Example 1 except that a polyvinylidene fluoride resin and dicyclohexyl phthalate were melt mixed to get a homogeneously dissolved solution, which was extruded in a form of hollow fiber from a spinneret at an extrusion rate of 5.5 m/min (a draft ratio of 10.9 times). A maximum pore diameter of the thus obtained microporous membrane was 39 nm, and observation results of a cross-sectional structure of the membrane by a scanning electron microscope showed that a thickness of a coarse structure layer formed adjacent to an inner surface side was 7 μm and a ratio of a fine structure layer to the whole membrane thickness was 84%. Physical properties of this microporous membrane are shown in Table 2.

COMPARATIVE EXAMPLE 1

A hollow fiber like microporous membrane was obtained in accordance with Example 3 except that diphenylcresyl phosphate (made by Daihachi Chem. Ind. Co., Ltd., industrial grade) was fed into a hollow part at 7 ml/min. A maximum pore diameter of the thus obtained microporous membrane was 38 nm, and observation results of a cross-sectional structure of the membrane showed that a thickness of a coarse structure layer formed adjacent to an inner surface side was 3 μm and a ratio of a fine structure layer to the whole membrane thickness was 90%. Physical properties of this microporous membrane are shown in Table 2.

COMPARATIVE EXAMPLE 2

A hollow fiber like microporous membrane was obtained in accordance with Example 3 except that di(2-ethylhexyl) phosphate (made by Daihachi Chem. Ind. Co., Ltd., industrial grade) was fed into a hollow part at 7 ml/min. A maximum pore diameter of the thus obtained microporous membrane was 39 nm, and observation results of a cross-sectional structure of the membrane showed that a thickness of a coarse structure layer formed adjacent to an inner surface side was thinner than 1 μm and a ratio of a fine structure layer to the whole membrane thickness was about 100%.

EXAMPLE 4

A composition consisting of 44% by weight of a polyvinylidene fluoride resin (SOFEF1012 made by SOLVAY, crystal melting point of 173° C.) and 56% by weight of dicyclohexyl phthalate (made by OSAKA ORGANIC CHEMICAL IND. LTD., industrial grade) was mixed under an agitation using a Henschel mixer at 70° C., followed by cooling to obtain a powder-like material, which was charged to a hopper of twin screw extruder (Laboplastmill Model 50C 150 made by Toyo Seiki Seisaku-Syo, Ltd.) and melt mixed at 220° C. to attain a homogeneous dissolution. Subsequently, the composition was extruded in a form of hollow fiber from a spinneret consisting of a circular orifice with an inner diameter of 0.8 mm and an outer diameter of 1.2 mm at an extrusion rate of 5.5 m/min, while diheptyl phthalate (made by Sanken Chem. Co., Ltd.) was fed at 120° C. into a hollow part at a rate of 7 ml/min. The extrudate was cooled and solidified in a water bath thermo-controlled at 40° C., and wound up on a hank at a rate of 60 m/min (a draft ratio of 10.9 times). A cooling rate in the cooling and solidifying was about 5,000° C./min. Thereafter, dicyclohexyl phthalate and diheptyl phthalate were removed by an extraction with n-hexane (made by Kishida Chem. Co., Ltd., special grade) and adhered hexane was removed by drying. The resultant membrane was then thermally treated at 130° C. for 1 hour in an oven to obtain a hollow fiber like microporous membrane. The membrane was fixed at a constant length during the thermal treatment to prevent shrinkage. A maximum pore diameter of the thus obtained microporous membrane was 38 nm, and observation results of a cross-sectional structure of the membrane by a scanning electron microscope showed that a thickness of a coarse structure layer formed adjacent to an inner surface side was 7 μm and a ratio of a fine structure layer to the whole membrane thickness was 75%. Physical properties of this microporous membrane are shown in Table 3.

EXAMPLE 5

A hollow fiber like microporous membrane was obtained in accordance with Example 4 except that dibutyl phthalate was fed into a hollow part at 7 ml/min. A maximum pore diameter of the thus obtained microporous membrane was 39 nm, and observation results of a cross-sectional structure of the membrane by a scanning electron microscope showed that a thickness of a coarse structure layer formed adjacent to an inner surface side was 12 μm and a ratio of a fine structure layer to the whole membrane thickness was 60%. Physical properties of this microporous membrane are shown in Table 3.

COMPARATIVE EXAMPLE 3

A hollow fiber like microporous membrane was obtained in accordance with Example 4 except that air was fed into a hollow part at 7 ml/min. A maximum pore diameter of the thus obtained microporous membrane was 37 nm, and observation results of a cross-sectional structure of the membrane showed that the structure was homogeneous along a membrane thickness direction, no coarse structure layer was present and a ratio of a fine structure layer to the whole membrane thickness was 100%. Furthermore, a skin layer with a low open pore ratio had been formed in an inner surface of this microporous membrane. Physical properties of this microporous membrane are shown in Table 3.

EXAMPLE 6

A hollow fiber like microporous membrane was obtained in accordance with Example 4 except that triphenyl phosphate was used as a plasticizer and tri(2-ethylhexyl) phosphate was fed into a hollow part at 7 ml/min. A maximum pore diameter of the thus obtained microporous membrane was 40 nm, and observation results of a cross-sectional structure of the membrane by a scanning electron microscope showed that a thickness of a coarse structure layer formed adjacent to an inner surface side was 9 μm and a ratio of a fine structure layer to the whole membrane thickness was 69%. Physical properties of this microporous membrane are shown in Table 3.

EXAMPLE 7

A microporous membrane obtained by Example 1 was hydrophilized using a grafting method. A reaction liquid was prepared by dissolving hydroxypropyl acrylate and poly (ethyleneglycol dimethacrylate) in a 25% by vol. of 3-butanol aqueous solution so that concentrations of the former and the latter chemicals became 1.1% by vol. and 0.6% by weight, respectively, and subjected to a nitrogen bubbling for 20 min. while maintained at 40° C. before use. Firstly, said microporous membrane was irradiated with 100 kGy of Co60 γ-ray under a nitrogen atmosphere. The irradiated membrane was left under a reduced pressure not higher than 13.4 Pa for 15 min, then contacted with the above described reaction liquid at 40° C. and left for further 2 hours. After that, the membrane was washed with ethanol, vacuum dried at 60° C. for 4 hours to get a hydrophilized microporous membrane. A weight increase of the resultant membrane was 14%. The thus obtained membrane was found to show a spontaneous water penetration into pores when contacted with water. A filtration test for 3% bovine immunoglobulin solution using this membrane revealed that a decrease in filtration rate was little and a clogging of membrane was also little as shown in Table 4.

EXAMPLE 8

A hydrophilized microporous membrane was obtained by the similar method as in Example 7 using the membrane obtained in Example 2. A weight increase of the thus obtained membrane was 13%. The resultant membrane was found to show a spontaneous water penetration into pores when contacted with water. A filtration test for 3% bovine immunoglobulin solution using this membrane revealed that a decrease in filtration rate was little and a clogging of membrane was also little as shown in Table 4.

EXAMPLE 9

A hydrophilized microporous membrane was obtained by the similar method as in Example 7 using the membrane obtained in Example 3. A weight increase of the thus obtained membrane was 12%. The resultant membrane was found to show a spontaneous water penetration into pores when contacted with water. A filtration test for 3% bovine immunoglobulin solution using this membrane revealed that a decrease in filtration rate was little and a clogging of membrane was also little as shown in Table 4.

COMPARATIVE EXAMPLE 4

A hydrophilized microporous membrane was obtained by the similar method as in Example 7 using the membrane obtained in Comparative Example 1. A weight increase of the thus obtained membrane was 10%. The resultant membrane was found to show a spontaneous water penetration into pores when contacted with water.

A filtration test for 3% bovine immunoglobulin solution using this membrane revealed as shown in FIG. 4 that a decrease in filtration rate with the passage of time was remarkable. This is considered to be brought about by the multimers of bovine immunoglobulin which clogged pores in an inner surface side of the microporous membrane.

TABLE 1

| Regional site along membrane thickness direction | Open pore ratio (%) | Assignment of each layer |
|---|---|---|
| 1 | 69.5 | Coarse structure layer |
| 2 | 68.4 | Coarse structure layer |
| 3 | 67.9 | Coarse structure layer |
| 4 | 67.5 | Coarse structure layer |
| 5 | 66.9 | Coarse structure layer |
| 6 | 66.9 | Coarse structure layer |
| 7 | 66.5 | Coarse structure layer |
| 8 | 66.2 | Coarse structure layer |
| 9 | 65.5 | Coarse structure layer |
| 10 | 64.3 | Coarse structure layer |
| 11 | 62.6 | Coarse structure layer |
| 12 | 60.4 | Coarse structure layer |
| 13 | 59.4 | Intermediate region |
| 14 | 56.6 | Fine structure layer |
| 15 | 56.3 | Fine structure layer |
| 16 | 56.5 | Fine structure layer |
| 17 | 56.2 | Fine structure layer |
| 18 | 56.3 | Fine structure layer |
| 33 | 56.8 | Fine structure layer |
| 34 | 56.0 | Fine structure layer |
| 35 | 56.5 | Fine structure layer |
| 36 | 57.6 | Fine structure layer |
| 37 | 55.4 | Fine structure layer |
| 38 | 54.2 | Fine structure layer |
| 69 | 55.9 | Fine structure layer |
| 70 | 56.9 | Fine structure layer |
| 71 | 57.0 | Fine structure layer |
| 72 | 57.0 | Fine structure layer |
| 73 | 56.7 | Fine structure layer |
| Average value for whole membrane thickness | 57.6 | |
| Average value excluding coarse structure part | 55.7 | |

TABLE 2

| Item | Example 1 | Example 2 | Example 3 | Comparative Example 1 |
|---|---|---|---|---|
| Form of microporous membrane | Hollow fiber | Hollow fiber | Hollow fiber | Hollow fiber |
| Inner diameter [μm] | 304 | 306 | 309 | 301 |
| Membrane thickness [μm] | 73 | 60 | 35 | 30 |
| Thickness of coarse structure layer [μm] | 12 | 9 | 7 | 3 |
| Ratio of fine structure layer [%] | 82 | 82 | 84 | 90 |
| Average pore diameter on the surface in coarse structure layer side [μm] | 0.42 | 0.44 | 0.39 | 0.29 |
| Porosity [%] | 55 | 57 | 57 | 53 |
| Max. pore diameter [nm] | 40 | 40 | 38 | 38 |
| Water permeation rate (Reduced value for membrane thickness 25μ) [$m^3/m^2/sec./Pa$] | 8.0E−10 | 7.5E−10 | 7.3E−10 | 6.9E−10 |

TABLE 3

| Item | Example 4 | Example 5 | Comparative Example 3 | Example 6 |
|---|---|---|---|---|
| Form of microporous membrane | Hollow fiber | Hollow fiber | Hollow fiber | Hollow fiber |
| Inner diameter [μm] | 306 | 297 | 301 | 302 |
| Membrane thickness [μm] | 32 | 34 | 29 | 32 |
| Thickness of Coarse structure layer [μm] | 7 | 12 | 0 | 9 |
| Ratio of fine Structure layer [%] | 75 | 60 | 100 | 69 |
| Porosity [%] | 58 | 60 | 58 | 55 |
| Max. pore diameter [nm] | 38 | 39 | 37 | 40 |
| Water permeation rate (Reduced value for membrane thickness 25μ) [$m^3/m^2/sec./Pa$] | 7.8E−10 | 10.8E−10 | 4.5E−10 | 6.9E−10 |
| Tensile break strength [$N/m^2$] | 3.33E7 | 3.86E7 | 3.35E7 | 3.46E7 |
| Tensile break elongation [%] | 343 | 385 | 360 | 365 |

TABLE 4

| Item | Example 7 | Example 8 | Example 9 | Comparative Example 4 |
|---|---|---|---|---|
| 3% IgG Integrated permeation amount (3 hr) | 127 | 96 | 88 | 32 |
| 3% IgG Permeation rate 1 (5 min) | 66 | 64 | 96 | 86 |
| 3% IgG Permeation rate 2 (30 min) | 54 | 46 | 55 | 16 |
| 3% IgG Permeation rate 3 (60 min) | 46 | 37 | 33 | 4 |
| 3% IgG Permeation rate 2/ 3% IgG Permeation rate 1 | 0.82 | 0.72 | 0.57 | 0.19 |
| 3% IgG Permeation rate 3/ 3% IgG Permeation rate 1 | 0.70 | 0.58 | 0.34 | 0.05 |

INDUSTRIAL APPLICABILITY

The microporous membrane of the present invention has a suitable pore diameter, a coarse structure layer with a higher open pore ratio and a homogeneous fine structure layer with a lower open pore ratio, and thus can provide a separation membrane which has a viral removal performance as well as a permeation performance, both well-balanced in a practical level, in a filtration of a solution of a drug or raw materials thereof, physiologically active substances, which has a risk of viral contamination.

The invention claimed is:

1. A multilayer microporous membrane containing a thermoplastic resin, said membrane comprising:
   a coarse structure layer with a higher open pore ratio and a fine structure layer with a lower open pore ratio,
   wherein said coarse structure layer is present at least in one membrane surface has a thickness of not less than 5.0 μm, and has an open pore ratio gradient that continuously decreases from the membrane surface toward said fine structure layer;
   said fine structure layer has a thickness of not less than 50% of the whole membrane thickness and has a microporous and homogeneous structure in which the open pore ratio is within the range of (an average open pore ratio of the fine structure layer) ±2.0% inclusive of both limits;
   said coarse structure layer and said fine structure layer are formed in one-piece; and
   the maximum pore diameter of said membrane determined by the bubble point method is 10–100 nm.

2. The multilayer microporous membrane in accordance with claim 1, wherein said coarse structure layer has the open pore ratio not less than an average open pore ratio of the whole membrane thickness+2.0% and said fine structure layer has the open pore ratio less than the average open pore ratio of the whole membrane thickness±2.0%.

3. The multilayer microporous membrane in accordance with claim 1, wherein an average pore diameter of a the membrane surface of said coarse structure layer is not less than two times of the maximum pore diameter of said membrane determined by the bubble point method.

4. The multilayer microporous membrane in accordance with claim 3, wherein said coarse structure layer is present only in one membrane surface.

5. The multilayer microporous membrane in accordance with claim 4, wherein said thermoplastic resin is a polyvinylidene fluoride resin.

6. The multilayer microporous membrane in accordance with claim 4, wherein said membrane is manufactured by a method comprising the following steps (a)–(c):
   (a) forming a precursor membrane by heating a composition comprising a thermoplastic resin and a plasticizer at a temperature not lower than a crystal melting point of said thermoplastic resin to homogeneously dissolve said thermoplastic resin and said plasticizer and then extruding said composition from a discharge opening;
   (b) forming the coarse structure layer and the fine structure layer by contacting one surface of said precursor membrane with a non-volatile liquid, in which said thermoplastic resin is partially soluble, under a heated state at a temperature not lower than 100° C. and cooling the other surface of said precursor membrane, while said precursor membrane is taken up at such a draw rate that a draft ratio defined below becomes not less than 1 and not higher than 12,
   Draft ratio=(a draw rate of the precursor membrane)/(a discharge rate of the composition at a discharge opening); and
   (c) removing a substantial portion of said plasticizer and said non-volatile liquid.

7. The multilayer microporous membrane in accordance with claim 6, wherein said composition has a thermally induced solid-liquid phase separation point.

8. The multilayer microporous membrane in accordance with claim 7, wherein said thermoplastic resin is a polyvinylidene fluoride resin.

9. The multilayer microporous membrane in accordance with claim 8, wherein said plasticizer is at least one selected from the group consisting of dicyclohexyl phthalate, triphenyl phosphate, diphenylcresyl phosphate, and trycresyl phosphate.

10. The multilayer microporous membrane in accordance with claim 9, wherein said non-volatile liquid is at least one selected from the group consisting of phthalate esters, adipate esters and sebacate esters whose ester chains have a carbon chain length not longer than 7, and phosphate esters and citrate esters whose ester chains have a carbon chain length not longer than 8.

11. The multilayer microporous membrane in accordance with claim 1, wherein membrane surfaces and an inner surface of micropore thereof are hydrophilized.

12. The multilayer microporous membrane in accordance with any one of claims 1–5, wherein the maximum pore diameter determined by the bubble point method is 15–50 nm.

13. The multilayer microporous membrane in accordance with claim 1, wherein said membrane is hydrophilic.

14. The multilayer microporous membrane in accordance with claim 1, wherein said membrane is a hollow fiber.

15. A method of removing a virus from a liquid containing a physiologically active substance, said method comprising filtering said liquid through the multilayer microporous membrane of claim 1.

16. The method of claim 15, wherein said physiologically active substance is a protein.

* * * * *